(12) United States Patent
Friedrich et al.

(10) Patent No.: US 7,340,399 B2
(45) Date of Patent: *Mar. 4, 2008

(54) SYSTEM AND METHOD FOR EYE TRACKING CONTROLLED SPEECH PROCESSING

(75) Inventors: Wolfgang Friedrich, Bubenreuth (DE); Wolfgang Wohlgemuth, Erlangen (DE); Xin Ye, Erlangen (DE)

(73) Assignee: Siemens AG, Munich (DE)

( * ) Notice: Subject to any disclaimer, the term of this patent is extended or adjusted under 35 U.S.C. 154(b) by 153 days.

This patent is subject to a terminal disclaimer.

(21) Appl. No.: 11/026,033

(22) Filed: Jan. 3, 2005

(65) Prior Publication Data

US 2005/0177375 A1    Aug. 11, 2005

Related U.S. Application Data

(63) Continuation of application No. 10/206,202, filed on Jul. 29, 2002, now Pat. No. 6,853,972, which is a continuation of application No. PCT/DE01/00137, filed on Jan. 15, 2001.

(30) Foreign Application Priority Data

Jan. 27, 2000    (DE) ............................... 100 03 550

(51) Int. Cl.
*G10L 15/00*    (2006.01)

(52) U.S. Cl. ....................... 704/275; 345/728

(58) Field of Classification Search ................ 345/728; 704/275

See application file for complete search history.

(56) References Cited

U.S. PATENT DOCUMENTS

| | | | |
|---|---|---|---|
| 5,668,573 A | 9/1997 | Favot et al. | |
| 5,864,815 A | 1/1999 | Rozak et al. | |
| 5,912,721 A | 6/1999 | Yamaguchi et al. | |
| 6,076,061 A | 6/2000 | Kawasaki et al. | |
| 6,111,580 A | 8/2000 | Kazama et al. | |
| 6,243,683 B1 | 6/2001 | Peters | |
| 6,351,273 B1* | 2/2002 | Lemelson et al. | 715/786 |
| 6,847,336 B1* | 1/2005 | Lemelson et al. | 345/8 |

FOREIGN PATENT DOCUMENTS

| | | |
|---|---|---|
| DE | 43 06 508 A1 | 9/1994 |
| DE | 43 07 590 A1 | 9/1994 |
| DE | 197 31 303 A1 | 2/1999 |
| EP | 0 718 823 A2 | 6/1996 |
| JP | 04-372012 A | 12/1992 |
| WO | WO 93/14454 A1 | 7/1993 |

* cited by examiner

Primary Examiner—Daniel Abebe
(74) Attorney, Agent, or Firm—Sughrue Mion, PLLC

(57) ABSTRACT

A system and method for operating and monitoring, in particular, an automation system and/or a production machine and/or machine tool. The visual field (9) of a user (1) directed onto at least one display (2) is recorded and an item of speech information (8) of the user (1) is evaluated at least intermittently, such that specifically predefined information data, which is linked to the recorded visual field (9) and to the recorded speech information, is depicted on the display (2). The predefined information data is displayed in accordance with the speech information (8) that is given by the user (1) and recognized by a speech recognition component (4) and in accordance with the recorded visual field (9). This provides a hands-free operation of the system, machine and/or tool, and enables the user to navigate in an environment of augmented reality applications even when complex technical systems are involved.

9 Claims, 3 Drawing Sheets

SYSTEM AND METHOD FOR EYE TRACKING CONTROLLED SPEECH PROCESSING

This is a Continuation Application of U.S. patent application Ser. No. 10/206,202 filed Jul. 29, 2002, now U.S. Pat. No. 6,853,972 which is a Continuation of International Application PCT/DE01/00137, with an international filing date of Jan. 15, 2001, which was published under PCT Article 21(2) in German, and the disclosures of which are incorporated into this application by reference.

FIELD OF AND BACKGROUND OF THE INVENTION

The invention relates to a system and method for operating and monitoring, for example, an automation system and/or a production machine and/or machine tool.

Such systems and methods are used, for example, in the field of automation technology, in production machines and machine tools, in diagnostic/service support systems, and for complex components, devices and systems, such as, for instance, vehicles and industrial machinery and plants.

OBJECTS OF THE INVENTION

One object of the invention is to provide a monitoring and operating system and an associated method, in particular for an automation system and/or a production machine and/or a machine tool, which enable hands-free operation by persons utilizing the system. It is another object to provide such a system and method that enable users to "navigate" in an environment of augmented reality applications even where complex technical systems are involved.

SUMMARY OF THE INVENTION

These and other objects are attained, according to one formulation of the invention, by a system that has a detection means for detecting a visual field of a user being directed onto a display; speech recognition means for recognizing speech information of the user; and control means for controlling the system; wherein, as a function of the speech information given by the user and recognized by the speech recognition means, and as a function of the visual field recorded by the detection means, the control means displays specifically defined information data linked to the detected visual field and the recognized speech information on the display; and wherein the control means activates the speech recognition means only if the detection means detects that the user's visual field is directed to the display.

A detection means, e.g., a camera, records the user's visual field on the display means, e.g., a monitor. At the same time, speech recognition means evaluate the user's speech. The detection means and the speech recognition means together form an eye tracking controlled speech recognition system. As a function of the recorded speech information and as a function of the recorded visual field on the display means, certain predefinable information data is displayed. If, for instance, a camera integrated with the display means, e.g., the screen, detects that the user is looking directly at the screen and consequently intends to monitor a corresponding process, the camera as the detection means activates the system's speech recognition means, resulting in a specific evaluation of the speech input. This results in a novel form of interaction for process visualization. If the user looks at another display means or at another field of the display means, control means can be used to display information associated with this visual field on the display means after speech recognition has taken place. This enables the user intuitively to operate and monitor a desired process or a desired production machine and/or machine tool, without using his or her hands, by changing his or her visual field in combination with speech control.

Accidental detection and interpretation of speech information that is not intended for the system can be prevented, or specific activation of speech recognition can be achieved by controlling the control means of the system in such a way that the speech recognition means are activated only if the detection means detect that the user's visual field relates to a specific display means and/or at least predefinable areas of the display.

In an advantageous embodiment of the detection means the detection means comprise a camera to detect the user's visual field. However, the detection means may also be embodied in the form of other optical tracking devices presently known or hereafter developed.

Interactive speech communication with the system can be ensured by providing the system with acoustic playback means. These acoustic playback means provide an acoustic rendering of acoustic information data that is generated in response to speech information given specifically by the user through the speech recognition means and is then transmitted to the acoustic playback means.

Specific speech processing is further enhanced by providing the system with additional display means, which are provided, e.g., for signaling the location of information data that is linked to recognized speech information.

The user is preferably provided with reliable information on the processing status of the system with respect to a speech signal that is being processed by including in the system a means for generating a visual feedback signal in response to and/or indicative of the processing status of the recognized speech information.

One embodiment of the feedback signal that is advantageous and easily recognizable by the user is a visual feedback signal configured as a software object, which is preferably superimposed in the area of the user's detected field of view.

Another means for readily noticeable feedback to support the speech information is to configure the visual feedback signal as a color signal that identifies the corresponding processing status of the detected speech information through color-coding.

BRIEF DESCRIPTION OF THE DRAWINGS

The invention will now be described and explained in greater detail with reference to the exemplary embodiments depicted in the figures in which.

DETAILED DESCRIPTION OF THE PREFERRED EMBODIMENTS

Figure 1:
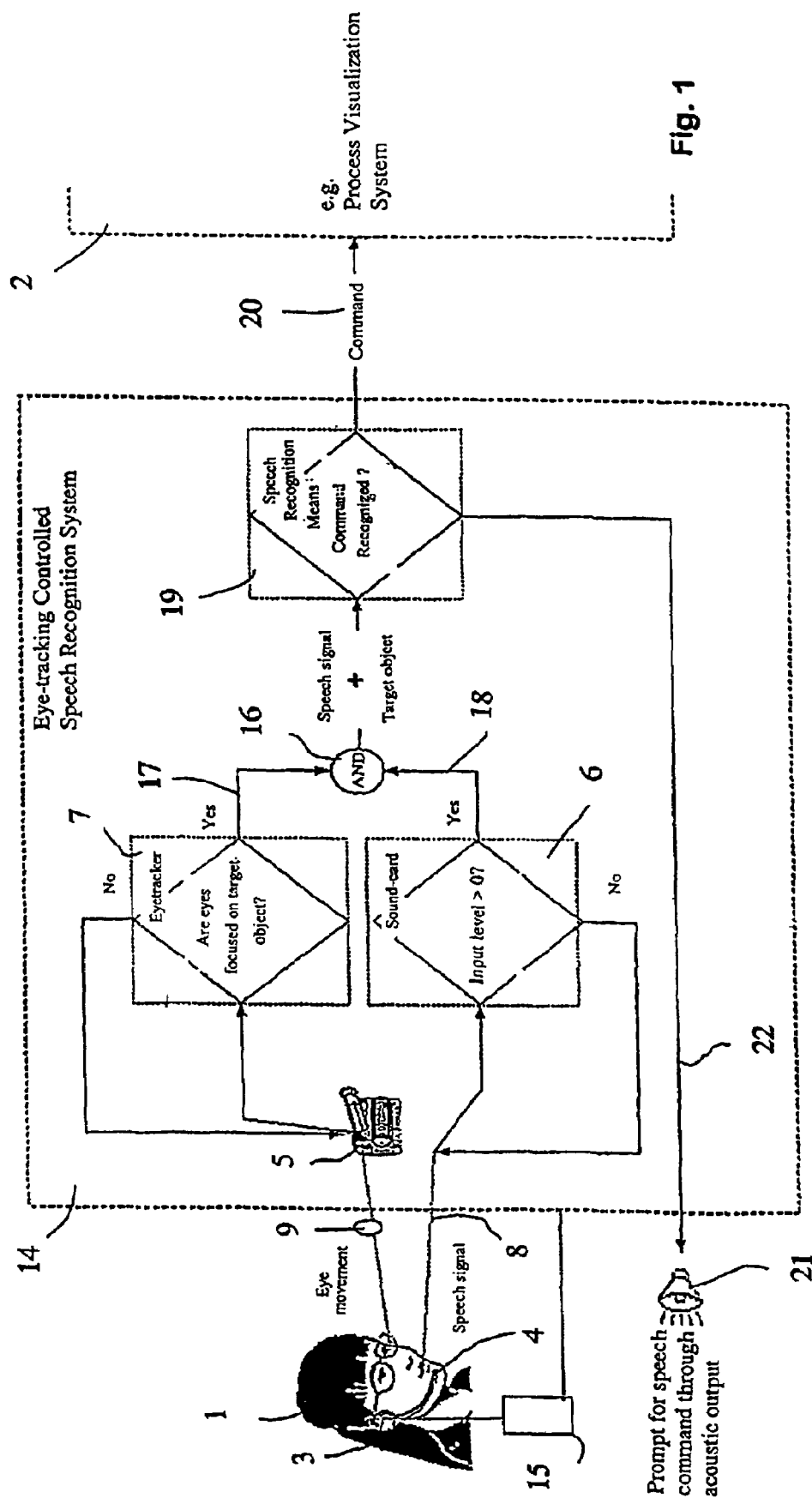
FIG. 1 is a block diagram of an exemplary embodiment of a speech-controlled system for operating and monitoring an automation system or machine tool.

FIG. 1 shows a block diagram of a eye tracking controlled speech processing system for operating and monitoring an automation system or machine tool. The eye tracking controlled speech processing system includes an eye tracking controlled speech recognition system 14 that can be controlled by a user 1. The user is equipped with mobile data goggles, which are coupled to a microphone 4, a loudspeaker 3 and a data transmission device 15. The eye tracking controlled speech recognition system 14 includes a camera 5 as detection means for detecting a visual field 9, i.e., the eye movements of user 1. The signals of the detection means 5 are supplied to an evaluation unit 7. The eye tracking controlled speech recognition system 14 further includes an acoustic evaluation unit 6, e.g., a sound card of a computer, which detects a speech signal 8 of user 1. If both the evaluation unit 7 and the acoustic evaluation unit 6 emit a positive signal 17, 18, i.e., if on the one hand the user's visual field 9 is directed toward at least predefinable areas of e.g., a display and on the other hand a corresponding speech signal of user 1 is also present, a speech recognition device 19, in case of a recognized speech signal 8, issues a corresponding command 20 to the display, e.g., within a process visualization system 2.

The special feature of the eye tracking controlled speech processing system shown in FIG. 1 is the combined evaluation of both the visual field 9 of user 1 and specific speech evaluation. This results in specific speech recognition, so that the user does not first have to look for the desired process images and process values, which may possibly be deeply embedded in operating hierarchies. Instead, the user can directly "call up" a desired object, a desired process value, etc. by focusing his or her eyes on a certain process image and by simultaneously giving a corresponding speech signal. This also clearly reduces the susceptibility to errors in speech recognition, since the speech recognition unit has to process only the detected speech commands that are linked to the respectively associated visual field and the process image, etc. which is related thereto. This increases the sensitivity for the recognition of speech commands and speech signals 8 of user 1. The speech signals 8 can be transmitted from microphone 4 to sound card 6, for instance, by a wireless unidirectional or bidirectional air interface. In the case of a bidirectional air interface between transmission system 15 and the eye tracking controlled speech recognition system 14, it is also possible directly to issue prompts 22 to user 1 if a speech signal 8 is not recognized. As an alternative, or in addition thereto, such prompts 22 may also be output via a loudspeaker 21.

Figure 2:
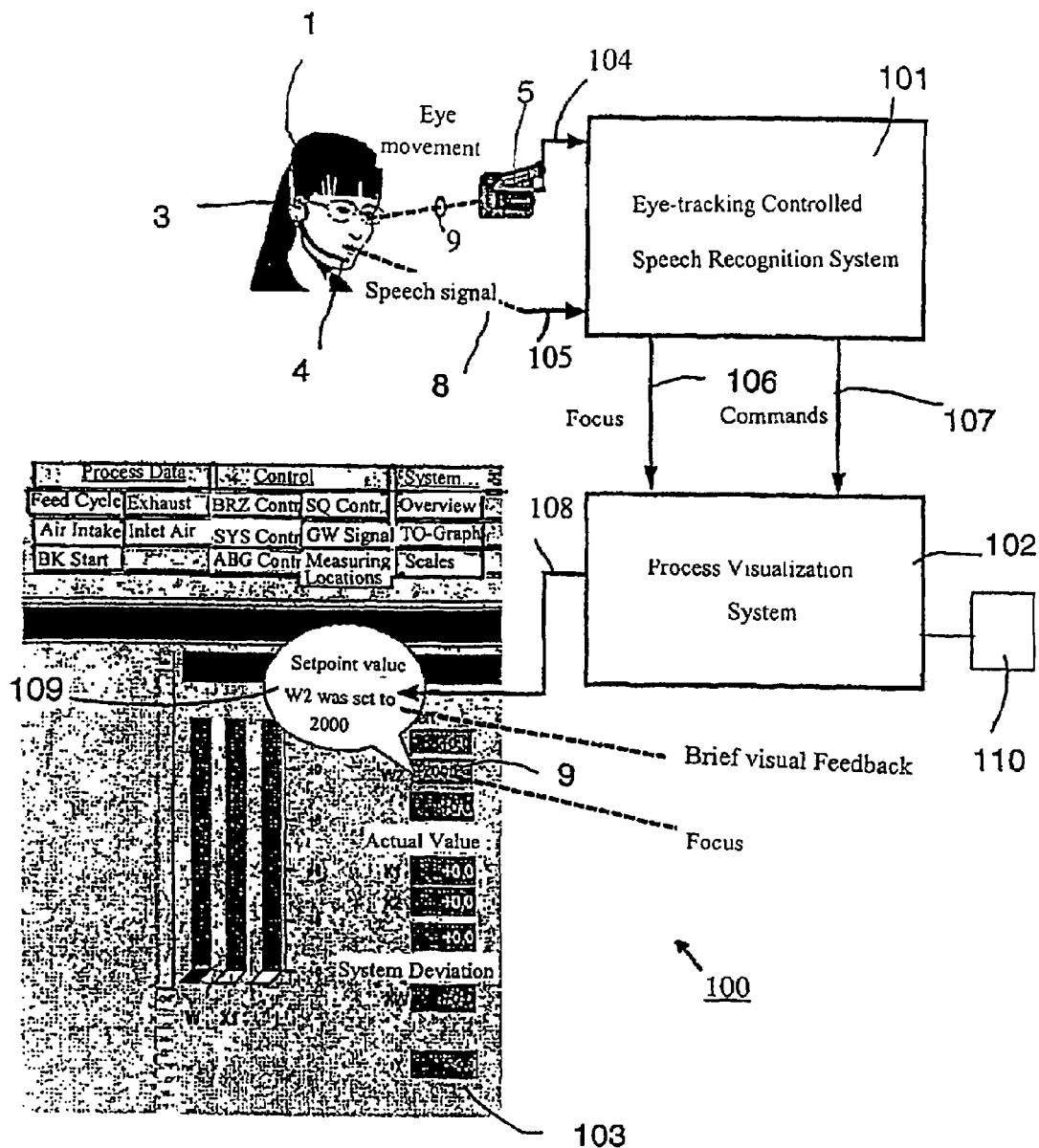
FIG. 2 is a block diagram of an exemplary embodiment of a speech-controlled system for operating and monitoring an automation system or a machine tool with a visual feedback signal in the form of a software object.

FIG. 2 shows, in a second embodiment, an eye tracking controlled speech recognition system for an operating and monitoring system 100 controlling, e.g., an automation system 110. The operating and monitoring system includes a process visualization system 102, which enables process control of the automation system through, e.g., a display form 103 such as the one shown in FIG. 2. The automation system 110 is not further depicted in FIG. 2 for the sake of clarity. The operating and monitoring system further includes an eye tracking controlled speech recognition unit 101, which receives input signals 104, 105 and supplies output signals 106, 107. Input signal 104 of the eye tracking controlled speech recognition unit is determined by a camera 5 as the detection means for recording the visual field 9 of a user 1. Input signal 105 is based on a speech signal 8 of the user, which is recorded, for instance, through a microphone 4 of a headset 3 of user 1. The eye tracking controlled speech recognition system 101 supplies a first output signal 106 that represents the user's visual field 9 and a second output signal 107 that is based on the user's speech signal 8. As a function of output signals 106, 107 of the eye tracking controlled speech recognition unit 101, an output signal 108 is generated in the process visualization system 102 and is superimposed on the display form 103 as a software object associated with the window that is being displayed in accordance with the user's visual field 9.

The exemplary embodiment depicted in FIG. 2 is based, e.g., on the following scenario:

User 1 monitors an automation system 110 with the aid of the process visualization system 102. The visual field 9 of user 1 is simultaneously tracked by the eye tracking controlled speech recognition system 101. User 1, through speech, i.e., by emitting a speech signal 8, calls up a desired object, e.g., a certain process value that is contained in visual field 9, or wishes to change a process value contained in visual field 9. In these cases, user 1 calls up the object through speech or calls out the new process value. A visual object 109, which contains the information regarding the processing of the user's speech command, is then superimposed directly within the user's visual field 9. If the control by means of the eye tracking controlled speech recognition system 101 is successful, the process visualization system 102, and thus the operating and monitoring system 100 incorporating the process visualization system 102, executes the corresponding commands and actions. Using the eye tracking controlled speech recognition system coupled with a visual feedback signal results in a particularly simple and intuitive man-machine interaction. User 1 receives direct feedback in the form of a brief feedback signal 109 and is informed as to whether his or her speech command 105, 107 was registered, understood and executed by the system 100.

Figure 3:
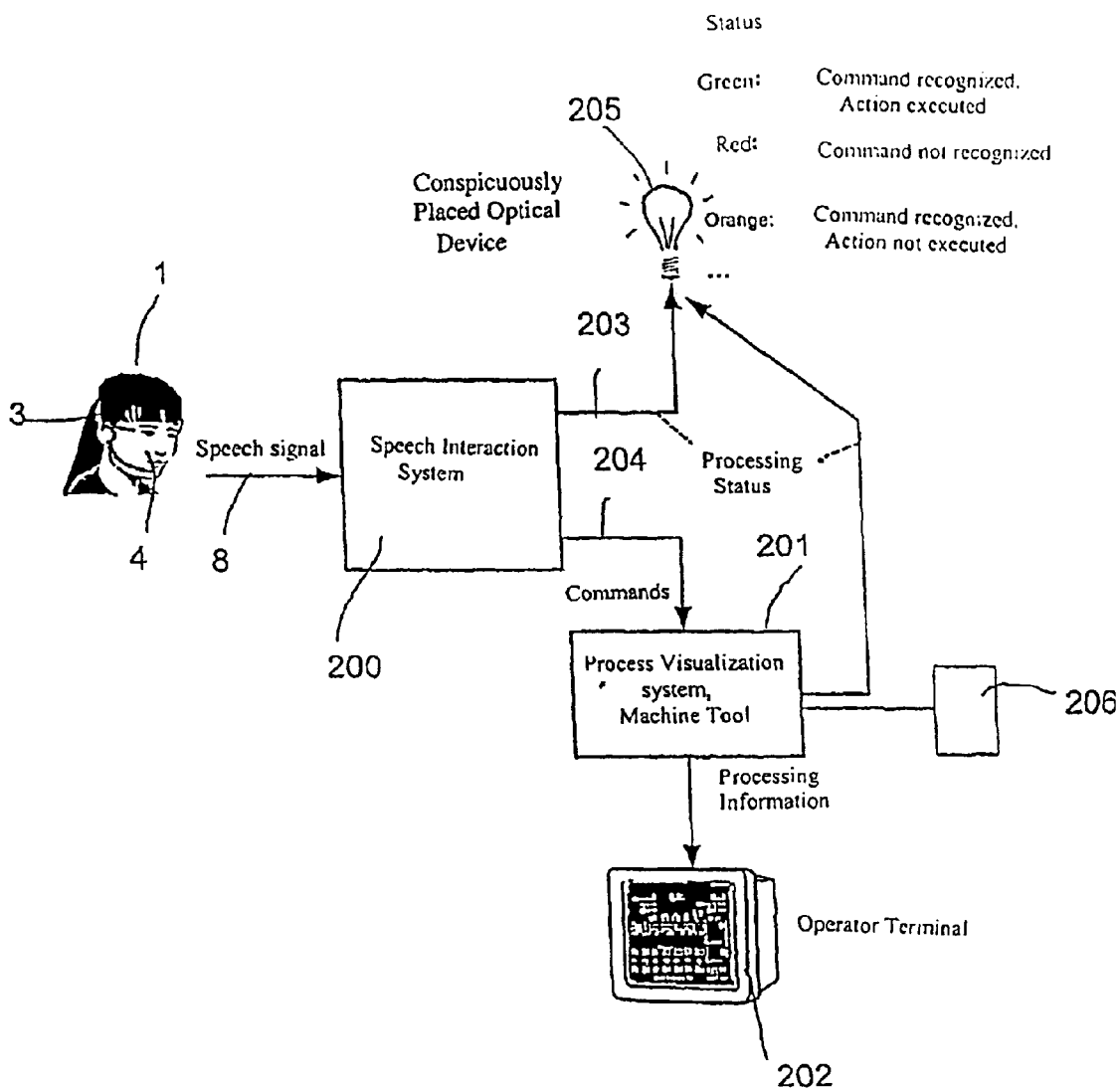
FIG. 3 is a block diagram of an exemplary embodiment of a speech-controlled system for operating and monitoring an automation system or a machine tool with a visual feedback signal in the form of an optical device.

FIG. 3 shows a further exemplary embodiment of an operating and monitoring system with speech recognition and a visual feedback signal for supporting speech interaction in process visualization and in production machines and machine tools. The system comprises a speech interaction system 200 that evaluates a speech signal 8 as an input signal of a user 1. As a function of speech signal 8, the speech interaction system 200 supplies a first output signal 203 and a second output signal 204. The first output signal 203 is supplied to a display 205 that displays different operating states, e.g., in different colors. The second output signal 204 of the speech interaction system 200 is supplied to a process visualization system 201 of a plant 206 or a machine tool. Visualization and operation and monitoring of plant 206 or the machine tool is effected via an operator terminal 202.

The system depicted in FIG. 3 is based, for instance, on the following scenario. The user, e.g., an operator of a machine tool or a plant 206, monitors plant 206 by means of the process visualization system 201 via the operator terminal 202. To execute an action of the plant/machine 206, user 1 uses speech to call out commands in the form of speech signals 8. Through a separately arranged, advantageously conspicuously positioned display device, e.g., in the form of a lamp, user 1 is informed of the processing status of his or her speech command. For instance, a green signal of lamp 205 indicates that a command has been recognized and the desired action has been performed. A red signaling lamp 205 indicates that a command was not recognized. An orange signaling lamp 205 can, for instance, indicate that a command has been recognized but that the corresponding action has not yet been executed. The method for visualizing feedback in response to speech commands for process monitoring as depicted in FIG. 3 is especially suitable in the field of production machine and machine tool control since it provides the user, i.e., the operator, with clear and unambiguous signaling of the processing status of his or her speech command 8 even across, if necessary, relatively large distances.

The eye tracking controlled speech processing for speech-controlled support of process visualization systems and machine tools should be understood, in particular, in the special context of the application fields "operation and monitoring of process automation systems" as well as "production machines and machine tools." The use of standard PCs as the visualization tools both on the management level and on the field level is a current trend in process automation. This form of interaction is not limited to mouse and keyboard, however. The increasing complexity of technical systems is making navigation among the process images more difficult. It is often necessary to go deep into the operating hierarchies in order to find a process image or a process value. In the field, hands-free operation, which is not possible with mouse and keyboard, can be advantageous.

Speech recognition and speech output systems, which are used on many standard PCs for dictation today, make it easier and more intuitive to navigate in process visualization. The user does not need to look for the desired process images and process values in the deep operating hierarchies, but can "call up" the object directly.

It is advantageous and important, e.g., in the context of a control room, where several operator terminals are used side by side (visualization of different parts of the plant), to have an interaction system that recognizes where the user is focusing his or her attention. However, even in situations where only a single terminal/monitor is used, it is very useful for the interaction system to recognize the element on which the users attention is focused.

For this purpose, preferably, a camera integrated with the display is used to record whether the user is currently looking at the screen and wants to monitor the corresponding process. According to the invention, only if this is the case, is the speech recognition activated. This avoids accidental recognition/interpretation of speech that is not intended as an instruction directed to the system. As a further enhancement, the system can be designed to inform the user whether the desired action is being executed.

The core of the invention lies in the novel form of interaction for process visualization and recognition of the element on which the user's attention is focused in order to process speech input specifically.

The following two scenarios describe exemplary embodiments of the basic idea:

Scenario A: (on the Management Level)

A plant administrator monitors the state of the plant through a visualization system. A portion of the plant is in a critical state. The visualized portion is blinking red in the overall plant image. The administrator looks at that portion of the screen, his focus is localized, and speech recognition is activated. The administrator simply calls out the process value or the process image that he would like to see in greater detail. Acoustic and/or optical feedback through a signal lamp and speech output confirms to the administrator that his words were recognized by the system and that the desired actions have been executed.

Scenario B: (in the Field)

A worker looks at the control panel and would like to check certain process values or perform certain actions. His hands are not free at the moment, however, and the control panel is located at a considerable distance. The worker calls up the desired process state through speech. Optical and acoustic feedback confirms that the command has been recognized and executed. If required, process values can also be announced.

In summary, the invention thus relates to a system and method for operating and monitoring, in particular, an automation system and/or a production machine and/or a machine tool. The system recognizes when the visual field 9 of a user 1 is directed at at least one display. Speech information 8 of user 1 is evaluated at least intermittently in such a way that, as a function of the speech information 8 given by user 1 and recognized by speech recognition means 4 and as a function of the detected visual field 9, specifically predefinable information data that is linked to the detected visual field 9 and the recognized speech information can be displayed on the display. This provides hands-free operation and a means for navigation in the environment of augmented reality applications even when complex technical systems are involved.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A system comprising:
a display;
a vision-tracking device that signals whether a user's gaze is directed towards a target area;
a speech processor that converts the user's speech into electronic command signals; and
an interconnection between said vision tracking device and said speech processor that enables said speech processor to output the electronic command signals only when said vision-tracking device signals that the user's gaze is directed towards the target area,
a visual feedback signal generator configured to generate a visual feedback signal relating to a processing status of the user's speech,
wherein the target area is located on a predefined area of the display, and
wherein the visual feedback signal comprises a software object that is superimposed onto the display in a detected visual field of the user that is detected by said vision-tracking device.

2. The system according to claim 1, further comprising:
a controller configured to process the electronic commands into control signals that control a downstream process; and
a feedback component that provides information to the user regarding the control signals.

3. The system according to claim 2, wherein said vision-tracking device detects a visual field of the user being directed onto a display; and
wherein said controller displays specifically defined information data linked to the detected visual field and the electronic command signals on the display.

4. The system according to claim 3, further comprising an additional display, configured to signal a location of the information data that is linked with the electronic command signals.

5. The system as claimed in claim 1, wherein the predefined area of the display is a discrete portion of the display which is smaller than the whole of the display.

6. The system according to claim 1, further comprising:
a controller configured to process the electronic commands into control signals that control at least one of an automation system, a production machine, and a machine tool.

7. The system according to claim 1, wherein said vision-tracking device comprises a camera for recording a visual field of the user.

8. The system according to claim 1, further comprising an acoustic playback device configured to output acoustic information data generated in response to the electronic command signals outputted by the speech processor.

9. A system comprising:
a display;
a vision-tracking device that signals whether a user's gaze is directed towards a target area;
a speech processor that converts the user's speech into electronic command signals; and
an interconnection between said vision tracking device and said speech processor that enables said speech processor to output the electronic command signals only when said vision-tracking device signals that the user's gaze is directed towards the target area,
a visual feedback signal generator configured to generate a visual feedback signal relating to a processing status of the user's speech,
wherein the target area is located on a predefined area of the display, and
wherein the visual feedback signal comprises a color signal that identifies the processing status of the user's speech.

* * * * *